ELECTRICAL CONNECTOR

Filed March 15, 1961 3 Sheets-Sheet 1

INVENTOR.
HOMER E. HENSCHEN
BY
Curtis, Morris + Safford

INVENTOR.
HOMER E. HENSCHEN
BY
Curtis, Morris & Safford

Sept. 7, 1965 H. E. HENSCHEN 3,205,468

ELECTRICAL CONNECTOR

Filed March 15, 1961 3 Sheets-Sheet 3

INVENTOR.
HOMER E. HENSCHEN
BY
Curtis, Morris & Safford

United States Patent Office
3,205,468
Patented Sept. 7, 1965

3,205,468
ELECTRICAL CONNECTOR
Homer E. Henschen, Carlisle, Pa., assignor to AMP Incorporated, Harrisburg, Pa.
Filed Mar. 15, 1961, Ser. No. 95,922
5 Claims. (Cl. 339—17)

This invention relates to disengageable electrical connections and particularly to the socket members of such connections.

The invention is particularly intended and adapted for usage in miniature and sub-miniature circuits which are finding increasing favor in the electronic arts. For a better understanding of the present invention, a discussion is presented in the following paragraphs of some of the problems in the forming of electrical connections for such sub-miniature circuits.

Miniaturization of electronic circuits is practical and feasible primarily because of the present availability of extremely small circuit components such as transistors, resistors and capacitors. These circuit components may have maximum dimensions in the range of 0.040″ to 0.060″ or less and their lead wires are of proportionate size. Obviously, if a circuit device is manufactured with these extremely small components for the purpose of maintaining minimum overall dimensions, it is necessary to substantially reduce the size of the electrical connections in the circuit. A further consideration which must be taken into account is that the voltages employed in these miniature circuit devices are substantially lower than those existing in circuits having components of conventional size. This means that the quality of the electrical connections, as regards resistance values and noise, must be higher than the quality of the connections required for conventional circuits. Finally, it should be pointed out that it is desirable to design miniature and subminiature circuits in a manner such that individual components or groups of components contained in modules can be easily removed and replaced in the circuit to facilitate both manufacture and maintenance. This desideratum would require the use of plug-in-type connections rather than soldered or welded connections.

For various reasons, pre-existing concepts of circuit connections, particularly disengageable circuit connections, are not directly adaptable to usage with miniature and sub-miniature components. In general, a more efficient usage of materials is required if the size of the disengageable circuit connection is reduced without degrading the quality of the connection. Some of the practical considerations involved in obtaining an extremely small disengageable electrical connection for a circuit will become apparent as the description proceeds.

An object of the invention is to provide an improved socket for one or more electrical terminals. A further object is to provide an improved helical spring type socket member which can be made in relatively small sizes for the reception of extremely small terminals. A further object is to provide a socket member for a pin or the like in which the force required to insert the pin increases as the insertion progresses, so that the maximum force for insertion is not required until the pin and socket have been accurately aligned with each other. A still further object is to provide an improved socket member of the helical spring type which, in use, is uniformly stressed throughout its length whereby a relatively high contact pressure can be developed with a relatively small helix wound from relatively fine wire.

These and other objects are achieved in a preferred embodiment of the invention comprising a disengageable connection between a connector tab and a pin. The pin may, for example, extend from a module containing several components or from a single component and the connector tab may be, in turn, connected to the conductors on a printed circuit board. A helical spring surrounds portions of the tab so that upon insertion of the pin into the spring, the tab and pin are pressed against each other to form the electrical connection. Advantageously, the individual coils of the spring are not axially aligned with each other when the spring is in its relaxed state but are misaligned so that upon insertion of the pin, the coils are brought into substantial alignment with each other. For example, the spring can have alternate coils displaced laterally of each other so that in the relaxed state it has two substantially parallel, but spaced apart, axes which are brought into coincidence with each other upon insertion of the pin. Alternatively, the spring can be in the form of a conventional helical spring which has been permanently deformed so that a second helix is formed, or superimposed, on the original spring. This second helix has a diameter which is only slightly greater than the diameter of the original helix but has a pitch which is substantially greater than the pitch of the original helix. This embodiment can be thought of as a helical spring having a helical, rather than a straight, axis with the individual convolutions of the spring surrounding both the helical axis as well as the straight line axis which extends through the helical axis.

There are several advantages in forming a helical spring type receptacle in this manner. In the first place, the diameter of the pin can be relatively small as compared to the size of the opening into which it is inserted (i.e. the axial opening of the coil spring). This means that manufacturing tolerances can be relatively generous which is a distinct advantage where the parts being manufactured are extremely small. The size difference between the pin and the spring also obviates the requirement for precise alignment of the two members for insertion, a feature which is also advantageous where the parts are of extremely small size. A still further advantageous feature of the invention is that the spring is utilized in a highly efficient manner to establish the contact pressure between the tab and the inserted pin so that a reliable low resistance electrical connection is achieved even though the parts are of extremely small size.

Figure 4:
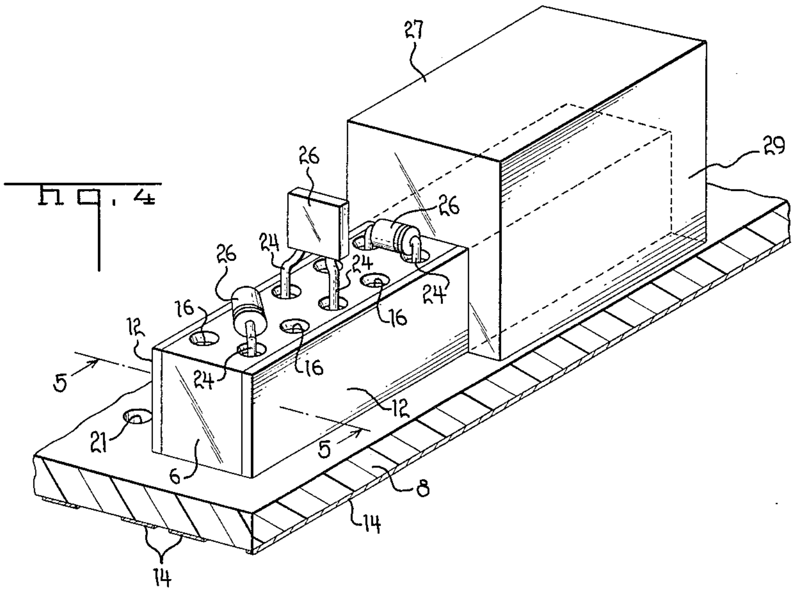
FIGURE 4 is a perspective view of a portion of a printed circuit board showing a connector block containing connectors in accordance with the invention.
Figures 5, 6:
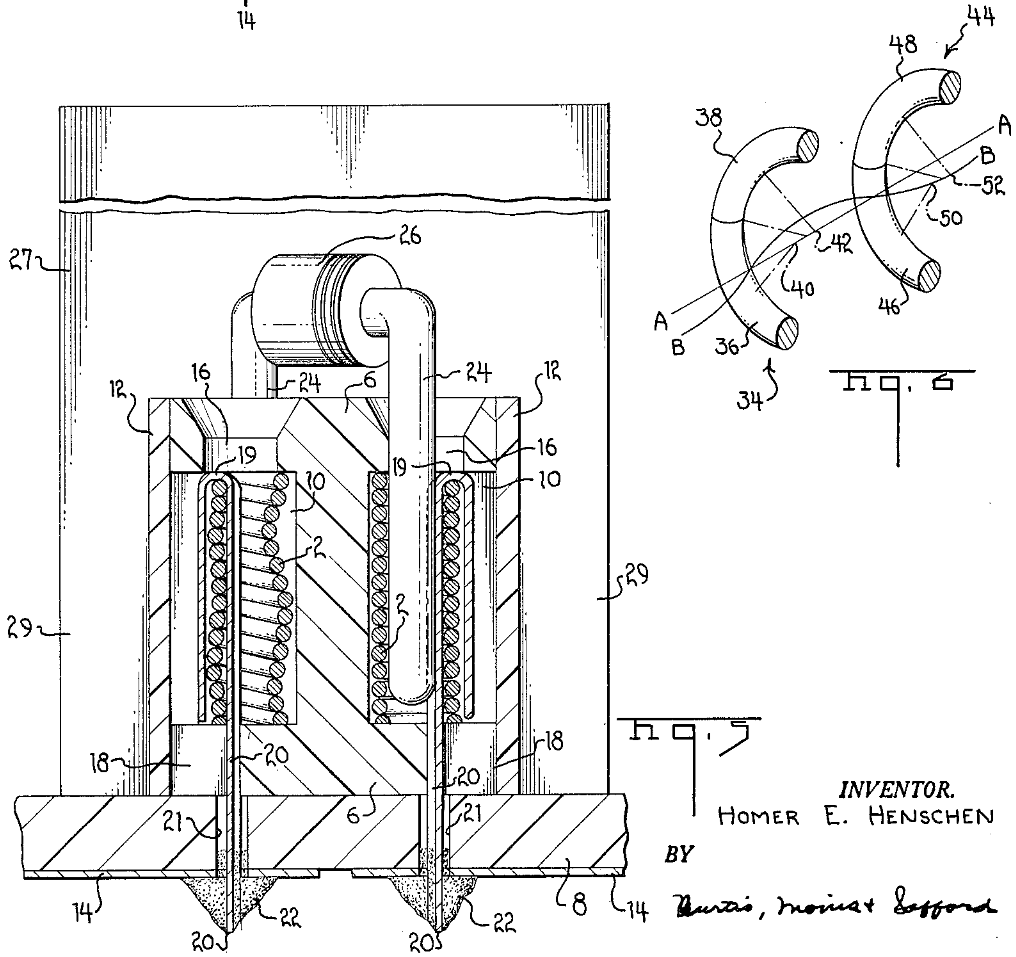
FIGURE 5 is a sectional view taken along the lines 5—5 of FIGURE 4.
FIGURE 6 is a diagrammatic view illustrating the difference between a coil spring in accordance with the invention and a conventional coil spring.

Referring first to FIGURES 4 and 5, a preferred form of the invention comprises a block 6 which is secured to a printed circuit board 8 having conducting paths 14 on its underside. Block 6 is provided with a plurality of cavities 10 which communicate with the top surface of the block by means of passageways 16, which are flared as at 17, and with the bottom surface thereof by means of slots 18. The cavities 10 extend inwardly from the sides of the block and are closed by means of panels 12 which are cemented or otherwise secured to the sides. Deformed coil springs 2 are mounted in the cavities 10 and a tab 20 extends from the underside of the board through an opening 21 in the board, through the slot 18 and through the spring 2. This tab is reversely bent at 19 and extends downwardly along the outside of the spring. Advantageously, the portion of the tab which is disposed inside the spring is of arcuate cross section so as to conform to the surface of the spring interior. The end of the tab is connected, as by solder at 22, to a conductor on the underside of the board.

In use, the circuit components are provided with pins 24 which are simply inserted through the openings 16 into the coil springs 2 so that tab and pin are pressed against each other to form an electrical connection. The insertion of the pin 24 resiliently deforms the coils of the spring so that they are brought into substantial alignment with each other. The circuit components may take the form of modules containing several components or of individual components as shown at 27. It is understood that the components in these modules will be electrically connected to pins extending from the module and between the sides 29 thereof. These pins are received in the springs 2 in the same manner, as is shown in FIGURE 5, as the pins 24.

As previously mentioned, the principles of the invention are particularly adapted to miniature and subminiature circuits. For example, the springs shown in FIGURE 5 can have a diameter of about 0.040 inch and can be wound from wire having a diameter of about 0.007 inch. Where the coils are of this size the pin 24 can have a diameter of about 0.020 to 0.025 inch. The tab 20 is advantageously quite thin, about 0.003 inch when the foregoing dimensions for the spring and pin are used and may be formed of pure copper. The extreme thinness of the tab permits it to be deformed by the spring upon insertion of the pin to achieve a relatively extensive area of contact between the two members.

The spring 2 can be a conventional coil spring which in its relaxed state is not symmetrical about its axis but which, upon insertion of the pin, becomes symmetrical as shown in FIGURE 5. For example, the spring can have alternate ones of its coils displaced out of alignment from the coil axis so that these alternate coils are brought into alignment upon insertion of the pin. As an alternative, one portion of the coil can be bodily misaligned with respect to the other portion so that the two portions are brought into alignment upon insertion of the pin.

Figures 1, 2, 3:
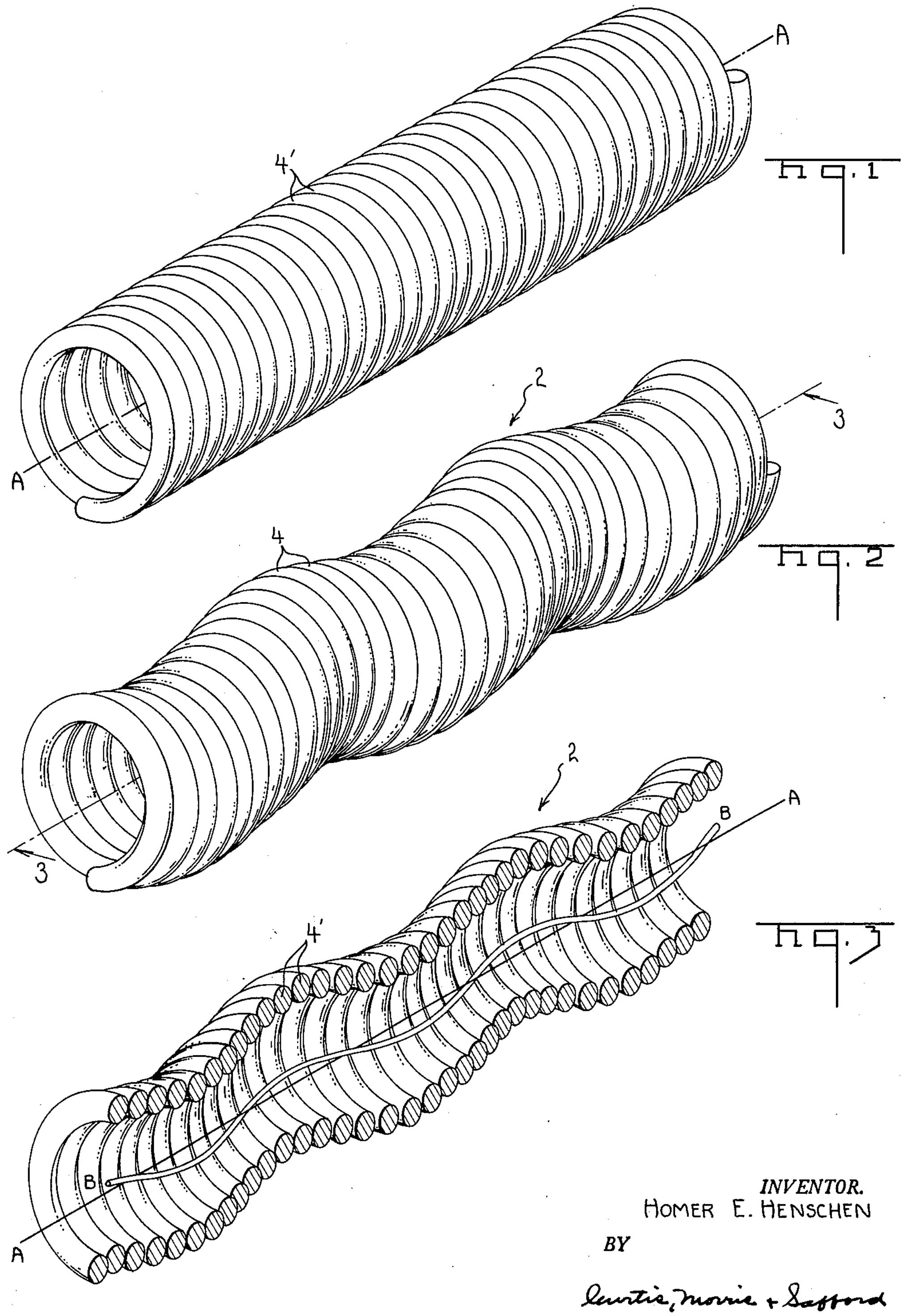
FIGURE 1 is a perspective view of a helical wire coil from which a connecting device in accordance with the invention is formed.
FIGURE 2 is a perspective view of one type of helical coil in accordance with the invention.
FIGURE 3 is a sectional view taken along the lines 3—3 of FIGURE 2.

A still further alternative form of coil spring for use with the invention can be formed from a conventional coil (FIGURE 1) having closely spaced turns 4′ and a straight line axis A—A by reforming the coil as shown in FIGURE 2. In accordance with this embodiment, each element of length of each of the coils 4′ is deformed in a manner such that the axis of these elements B—B becomes a helix rather than a straight line. A further feature of this embodiment is that this helical axis, B—B, surrounds the original axis, A—A, of the original conventional helical coil. The pitch of helical axis, B—B, is advantageously substantially greater than the pitch of the individual coils and, in a preferred embodiment of the invention, is equal to about seven times the pitch of the individual coils.

Coils in accordance with this embodiment (FIGURE 2) thus differ from conventional helical coils (FIGURE 1) in that in a conventional helical coil, each element (i.e. short length) of each turn of the coil has a center of curvature which is incrementally displaced along the straight-line axis, A—A, from the next adjacent elements of the coil. In the case of coils as shown in FIGURE 2, however, each element of length of the wire of each turn has a center of curvature which is displaced along the helical axis, B—B, from the next adjacent elements of the turn. FIGURE 6 illustrates this difference and shows a section 34 of a coil of a conventional helical spring having an axis A—A. The section 34 can be considered as being composed of two infinitesimally short elements of wire length 36, 38. The center of curvature of element 36 is shown at 40 while the center of curvature of element 38 is at 42. Both of these centers 40, 42, lie on straight line axis, A—A, the center 42 being disposed rightwardly of center 40.

FIGURE 6 also shows a section 44 of a coil of a helical spring of the type shown in FIGURE 2 which is composed of two infinitesimally short elements 46, 48. The centers of these elements lie on the helical axis, B—B, at 50 and 52, the center 52 being disposed rightwardly of the center 50.

The coil spring of FIGURES 2 and 3 can also be visualized by thinking of the results which is obtained if a conventional helical coil as shown in FIGURE 1 is passed between a pair of thread rolling dies which impart to its surface a helical configuration having a relatively large pitch as compared to the pitch of the original coil. If a conventional coil (FIGURE 1) is passed through such a set of dies, each element of each individual turn of the coil will be permanently deformed as described above and the coil of FIGURES 2 and 3 will be produced.

An important structural feature of the invention as described above is that the deformation imparted to the coil of FIGURE 1 to produce the coil of FIGURE 2 is not, in any way, localized. Rather, each extremely short element of length of each coil is deformed and the total deformation of all of the individual elements of length. The importance of this structural feature of the invention will be apparent from the discussion which follows of some of its advantages and uses.

A salient advantage of the coil of FIGURE 2 is that when the pin or other mating device is inserted into a coil of the type shown in FIGURE 2 and the coil is elastically deformed to force the pin into engagement with the tab, each element of each turn is elastically stressed and a substantially uniform stress is imposed upon the coil throughout its length. This feature results in a highly efficient use of the coil so that the coil can be made in an extremely small size and can be wound with an extremely fine wire and a high overall contact pressure between the coil and the inserted member or between the two inserted members can still be obtained. A further advantageous feature is that it is well known to the art to wind coils in extremely small sizes and these extremely small coils can be deformed to produce coils in accordance with the invention. For example, the invention has successfully been employed in forming a coil having a general overall diameter of 0.040 inch wound from wire having a diameter of 0.007 inch. A coil of this size is adapted to receive a mating pin in the range of 0.020 to 0.025 inch. The principles of the invention then can thus be utilized in circuits involving extremely small components in accordance with the present trends of design.

An additional advantage is that extremely close tolerances, as regards to the coil and the pin, are not required. Since the individual turns of the coil follow the helical axis, B—B, of FIGURE 2 the pin which is inserted into the coil can be substantially smaller than the overall opening of the coil into which it is inserted but upon insertion of the pin, a relatively large amount of contact area between the coil and the pin will be obtained. It is also advantageous that upon insertion of the pin, the force required for insertion increases linearly as the insertion proceeds and the maximum inserting force is not required until the pin is almost entirely inserted into the coil. This feature is important again in small size connectors since an extremely small diameter pin, for example, 0.020 inch, will have a very low column strength and if it is attempted to insert such a pin into a connector socket requiring a high threshold inserting force, there is a strong possibility that the pin itself will buckle and be damaged. In accordance with the instant invention this high inserting force is not required until the pin is almost entirely inserted and is supported over most of its length and the possibility of buckling is thereby substantially reduced.

Coil springs of the type shown in FIGURE 2 can be manufactured in a number of ways. One method is to merely form a conventional coil spring and then to pass this coil spring between a pair of thread rolling dies of the type commonly used to produce threads on a bolt or screw. The arrangement is such that the coil spring is permanently deformed upon passage between the rolls and in effect has screw threads of relatively large pitch impressed upon itself. This concept can be thought of in envisioning the invention in that it can be viewed as a simple coil spring having screw threads formed upon its external surface by a pair of thread-rolling dies.

Figures 7, 8:
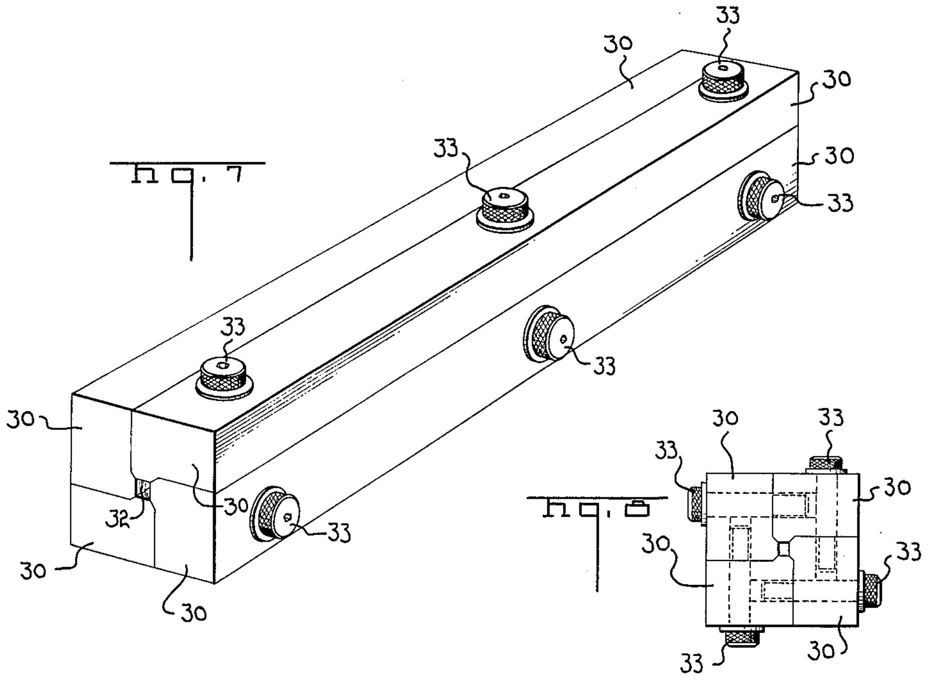
FIGURE 7 is a perspective view showing a jig for forming coils in accordance with the invention.
FIGURE 8 is an end view of the jig of FIGURE 7.
Figure 9:
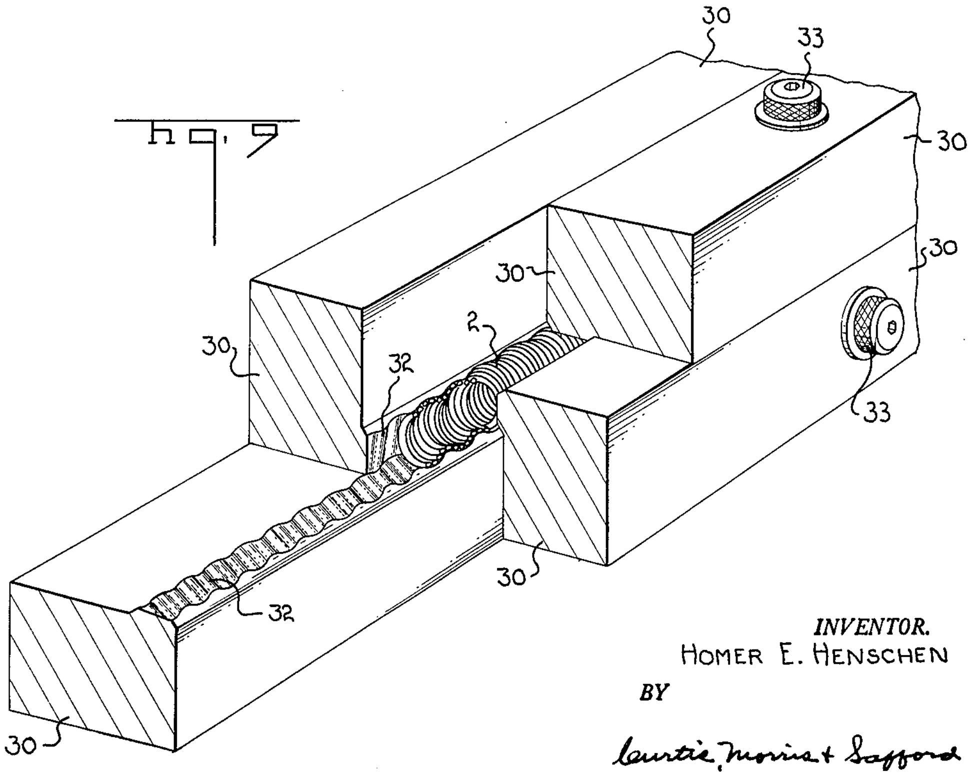
FIGURE 9 is a view similar to FIGURE 7 but with parts broken away.

Alternatively, springs in accordance with the invention can be produced by means of work holders as shown in FIGURES 7, 8 and 9. These sectional work holders 30 have complementary surfaces 32 which define an opening when the sections are assembled to each other by screws 33 as shown in FIGURE 7. The surface 32 of each work holder section is shaped to conform to the external surface of a longitudinal element of a helix so that a coil spring positioned within the opening defined by the four work holder sections is elastically deformed and the second helix, referred to above, is superimposed upon the spring. The entire assembly of the work holder and the spring is then heated, for example, by means of a fused salt bath, to a temperature above the transition temperature for the metal of the spring. For example, where a steel wire spring is being heat treated, the temperature would be above about 720 degrees C. The assembly is then quenched and the springs removed. Since the springs were quenched from a temperature above their transformation temperature, they will have the second helix, the superimposed helix described above, in their normal relaxed state and will be resiliently or elastically deformed upon insertion of the pin as described above.

An additional method of manufacture is to initially wind the coils on a mandrel having a helical surface so that the superimposed helix is formed when the spring is initially wound. The invention is thus not limited to a method of manufacture which involves deforming a conventional helix having a straight line axis.

Changes in construction will occur to those skilled in the art and various apparently different modifications and embodiments may be made without departing from the scope of the invention. The matter set forth in the foregoing description and accompanying drawings is offered by way of illustration only. The actual scope of the invention is intended to be defined in the following claims when viewed in their proper perspective against the prior art.

I claim:

1. An electrical connecting device comprising, a helical spring having a helical axis, the pitch of said axis being greater than the pitch of the individual coils of said spring, each coil of said helical spring surrounding the axis of said helical axis, and a tab received within said spring and extending axially therefrom, said spring being adapted to receive a pin whereby said spring is elastically stressed and its coils are brought into substantial alignment with each other, and said pin is pressed against said tab to form an electrical contact therewith.

2. An electrical connecting device for use with a printed circuit board having conductors thereon comprising, a metal tab electrically connected to at least one of said conductors and extending normally of the plane of said board, a helical spring surrounding said tab, said spring having a helical axis with the pitch of said axis being substantially greater than the pitch of the individual coils of said spring, each coil of said helical spring surrounding the axis of said helical axis, said spring being adapted to receive a mating connector whereby the coils of said spring are elastically moved relatively into alignment with each other and said mating connector is electrically connected to said tab.

3. An electrical connecting device comprising a helical spring having a helical axis, the pitch of said axis being greater than the pitch of the individual coils of said spring, and each coil of said helical spring surrounding the axis of said helical axis, said spring being adapted to receive a mating connector whereby the coils of said spring are moved relatively into alignment with each other to grip said mating connector.

4. An electrical connecting device comprising a helical spring having cyclically misaligned coils defining a helical axis of said spring, the pitch of said axis being greater than the pitch of the individual coils of said spring, and each coil of said helical spring surrounding the axis of said helical axis.

5. An electrical connection comprising, a pair of aligned overlapping terminals and a helical spring in surrounding and embracing relationship to said terminals, said spring having a helical axis in its normal relaxed state with each element of each convolution having a center of curvature which is removed along said helical axis from adjacent elements, said spring being resiliently deformed by said terminals until the convolutions of said spring are aligned around a substantially straight axis whereby, said spring is substantially uniformly stressed in each element of its convolutions.

References Cited by the Examiner

UNITED STATES PATENTS

| | | | |
|---|---|---|---|
| 867,943 | 10/07 | Boles. | |
| 2,124,461 | 7/38 | Challett | 339—256 |
| 2,503,406 | 4/50 | Osterman et al. | 339—259 |
| 2,836,805 | 5/58 | Goldsmith. | |
| 2,902,629 | 9/59 | Little et al. | 339—256 |
| 2,992,403 | 7/61 | Hawk | 339—17 |
| 3,058,083 | 10/62 | Schneider | 339—17 |

FOREIGN PATENTS

| | | |
|---|---|---|
| 855,712 | 2/40 | France. |
| 1,013,561 | 4/52 | France. |
| 561,834 | 10/32 | Germany. |
| 897,438 | 11/53 | Germany. |
| 493,859 | 5/54 | Italy. |
| 334,791 | 1/59 | Switzerland. |

JOSEPH D. SEERS, *Primary Examiner.*